US006048625A

United States Patent [19]

Miura et al.

[11] Patent Number: 6,048,625

[45] Date of Patent: Apr. 11, 2000

[54] WEAR RESISTING STEEL, SLIDING MEMBER FOR CYLINDER IN INTERNAL COMBUSTION ENGINE, AND RING SPRING

[75] Inventors: Kenzo Miura; Hitoshi Okamoto; Tatsuhiro Jibiki; Takao Tanaka; Shinichi Miyake; Naohiro Tanaka, all of Okayama, Japan

[73] Assignee: Mitsui Engineering & Shipbuilding Co., Ltd., Tokyo, Japan

[21] Appl. No.: 09/009,240

[22] Filed: Jan. 20, 1998

[51] Int. Cl.[7] .......... B32B 9/00

[52] U.S. Cl. .......... 428/472; 428/469; 428/639; 277/440; 277/442; 267/81

[58] Field of Search .......... 428/409, 472, 428/639; 277/440, 442; 267/81

[56] References Cited

FOREIGN PATENT DOCUMENTS

| | | |
|---|---|---|
| 0 464 799 | 1/1992 | European Pat. Off. . |
| 2-204604 | 8/1990 | Japan . |
| 6-207671 | 7/1994 | Japan . |
| 6-221436 | 8/1994 | Japan . |
| 6-330241 | 11/1994 | Japan . |

*Primary Examiner*—John J. Zimmerman
*Assistant Examiner*—Jason Resnick
*Attorney, Agent, or Firm*—Kanesaka & Takeuchi

[57] ABSTRACT

Wear resisting steel, a sliding member for a cylinder in an internal combustion engine, and a ring spring consist of: carbon: equal to or less than 2.2% by weight; silicon: equal to or less than 1.2% by weight; manganese: equal to or more than 0.2 % by weight and less than 1.20% by weight; chromium: equal to or less than 16% by weight; phosphorus: equal to or less than 0.08% by weight; sulfur: equal to or more than 0.15% by weight; other compositions: equal to or less than 2.0 % by weiht; and the balance substantially consisting of iron. The surfaces thereof may be sulphurized. The steel has excellent resistance to wear and scuffing, provides high strength, great elongation, and high toughness, and also provides good machinability.

10 Claims, 6 Drawing Sheets

COMPARATIVE EXAMPLES 5.6 (NO SURFACE TREATMENT)

COMPARATIVE EXAMPLES 1.2 (SULPHURIZING)

STROKE CHANGE OF TEST RING SPRING

WEAR RESISTING STEEL, SLIDING MEMBER FOR CYLINDER IN INTERNAL COMBUSTION ENGINE, AND RING SPRING

BACKGROUND OF THE INVENTION

1. Related Art Statement

The present invention relates to wear resisting steel, a sliding member for a cylinder in an internal combustion engine, and a ring spring, and more particularly, to high performance wear resisting steel, a sliding member for a cylinder in an internal combustion engine, and a ring spring wherein the wear resisting steel has excellent resistance to wear and scuffing, provides greater strength and greater elongation than cast iron and greater toughness than ultra-high strength steel or sintered hard alloy, and also provides good machinability.

A piston ring used in an internal combustion engine such as a diesel engine requires properties and characteristics such as wear resistance and anti-scuffing. Conventionally, flake graphite cast iron (hereinafter, referred to as "cast iron") such as Uballoy (trade mark of JAPAN PISTON RING CO., LTD), ultrahigh strength steel with greater hardness, and sintered hard alloy are well known as wear resisting material for such a purpose.

However, cast iron has disadvantages of poor strength and low elongation, and ultrahigh strength steel and sintered hard alloy have also disadvantages of poor toughness, and poor machinability.

By the way, a ring spring is used for a stretcher of a leveler for rolled steel sheets. Since the ring spring requires relatively high strength and toughness, spring steel is conventionally used for the ring spring.

2. Object and Summary of the Invention

It is a first aim of the present invention to provide wear resisting steel having stable anti-scuffing property and a sliding member for a cylinder made of the wear resisting steel.

A ring spring made of conventional material is damaged on its sliding surface so that its life-time is quite short.

It is a second aim of the present invention to keep the characteristics of the ring spring for a long period without considerable damage so as to lengthen product life.

Wear resisting steel according to the present invention consists of:

carbon: equal to or less than 2.2% by weight; silicon: equal to or less than 1.2% by weight; manganese: equal to or more than 0.2% by weight and less than 1.20% by weight, chromium: equal to or less than 16% by weight; phosphorus: equal to or less than 0.08% by weight; sulfur: equal to or more than 0.15% by weight and less than 0.60% by weight; other compositions: equal to or less than 2.0% by weight; and the balance substantially comprising of iron.

The ranges of compositions of preferred wear resisting steels (No. 1 through No. 4) are listed in the following Table 1.

TABLE 1

(wt %)

| No. of Steel | C | Si | Mn | Cr | P | S | others | Fe |
|---|---|---|---|---|---|---|---|---|
| No. 1 | ≦2.2 | ≦1.2 | 1.20 ≧ 0.2 | ≦16 | ≦0.08 | 0.60 ≧ 0.15 | ≦2.0 | bal. |
| No. 2 | ≦2.2 | ≦1.2 | 1.20 ≧ 0.2 | ≦6.0 | ≦0.08 | 0.60 ≧ 0.15 | ≦2.0 | bal. |
| No. 3 | 0.25~2.0 | 0.20~1.20 | 0.40~1.20 | 0.80~5.50 | ≦0.05 | 0.20~0.50 | ≦1.0 | bal. |
| No. 4 | 0.60~2.0 | 0.10~0.40 | 0.40~1.0 | 11.0~15.0 | ≦0.05 | 0.20~0.60 | ≦1.0 | bal. |

For the following reasons, the compositions of No. 1 steel are limited as shown in Table 1.

C>1.8 (means "C exceeds 1.8% by weight", hereinafter, signs are used in the same manner), Si>1.2, P>0.08, or Cr>16 makes the mechanical properties (material strength, elongation) poor. Particularly, C>2.2 makes the elongation remarkably poor. S<0.15, Mn<0.2 (less than 0.2 % by weight) make the sliding properties (anti-scuffing) poor.

It should be noted that Cr≦6.0 (6.0% by weight or less) such as No. 2 steel improves the mechanical properties.

No. 3 steel and No. 4 steel both offer a good balance between the mechanical properties and the sliding properties thereof.

A sliding member for a cylinder in an internal combustion engine and a ring spring according to the present invention are made of the wear resisting steel as described above.

It is preferable that the surface of the wear resisting steel is sulphurized by electrolysis or is treated by baking molybdenum dioxide after electrolyte sulphurizing.

The sliding member for a cylinder in an internal combustion engine according to the present invention may be a piston ring, a cylinder liner, or a piston skirt.

The ring spring of the present invention comprises inner rings and outer rings wherein at least sliding surfaces of the inner rings and/or outer rings are made of the aforementioned wear resisting steel. Employing the wear resisting steel for the ring spring keeps up the good spring property of the ring spring for long periods, thereby extending the ring spring's life.

The numbers of the inner and outer rings of the ring spring, the inner diameters and so on are not limited. Lubricant (for example $MoS_2$ grease) is preferably applied on the sliding surfaces between the inner rings and the outer rings.

The wear resisting steel, the sliding member for a cylinder in an internal combustion engine and the ring spring according to the present invention are generally sulphurized after being processed by the following normal heat treatment before use. Laser heat treatment or subzero treatment may be employed besides the following heat treatment.

Method of heat treatment and conditions

Heating (temperature: 780–840 ° C.)→Quenching in oil→Tempering (temperature: 200–600 ° C.)→Air cooling.

The sulphurizing according to the present invention is conducted to form a sulphurized layer (iron sulfide $Fe_xS$) on the surface of the steel by the electrochemical reaction (ionic reaction) by soaking the steel in molten salt in a vessel to electrolyze the steel as anode with the counter electrode as cathode.

It is enough to form the sulphurized layer of 10 μm or less, normally 3–9 μm, preferably 5–8 μm in depth.

The wear resisting steel of the present invention has excellent resistance to wear and scuffing, provides greater strength and greater elongation than cast iron and greater toughness than ultrahigh strength steel or sintered hard alloy, and also provides good machinability.

The wear resisting steel of the present invention is particularly industrially useful as a material of a sliding member for a cylinder in an internal combustion engine such as a piston ring, a cylinder liner, or a piston skirt, and a ring spring.

DETAILED DESCRIPTION OF PREFERRED EMBODIMENTS

Here in after, the present invention will now be described more concretely using non-limiting embodiments and comparative examples.

Embodiments 1, 2, and Comparative Examples 1, 2, 3, 4, 5, 6

Scuffing tests are conducted with pins (sometimes, referred to as "test pieces") made of wear resisting steel having following compositions.

TABLE 2

| Compositions | C | Si | Mn | Cr | P | S | Others | Fe |
|---|---|---|---|---|---|---|---|---|
| Embodiment 1 | 1.00 | 0.48 | 0.96 | 1.13 | 0.03 | 0.35 | 0.29 | bal. |
| Embodiment 2 | 0.90 | 0.30 | 0.60 | 11.9 | 0.02 | 0.30 | 0.23 | bal. |

The pins of wear resisting steel are processed by heat treatment as follows.

Method of heat treatment and conditions

Heating (820° C.)→Quenching in oil→Tempering (200–600° C.)→Air cooling.

It should be noted that, as a result of the heat treatment, the microstructure of the steel became either of tempered troostite and tempered sorbite with cementite.

In Embodiments 1 and 2, after the heat treatment, the pins are sulphurized by electrolysis in molten salt at 190° C. As a result of this, each pin is provided with a sulphurized layer formed in the surface at 8 μm depth.

In Comparative Examples 1 and 2, pins are processed by Ni—P plating of 1 μm in thickness instead of the sulphurizing of Embodiments 1 and 2. In Comparative Examples 3 and 4, pins are ionitrided to form nitrided layers in the surfaces at 40 μm depth, respectively, instead of the sulphurizing of Embodiments 1 and 2.

In Comparative Examples 5 and 6, scuffing tests are conducted with pins processed only by the aforementioned heat treatment without any surface treatment.

Details of the scuffing tests are as follows.

(1) Test piece for scuffing test

1. Pin (Tip)

Figure 1A:
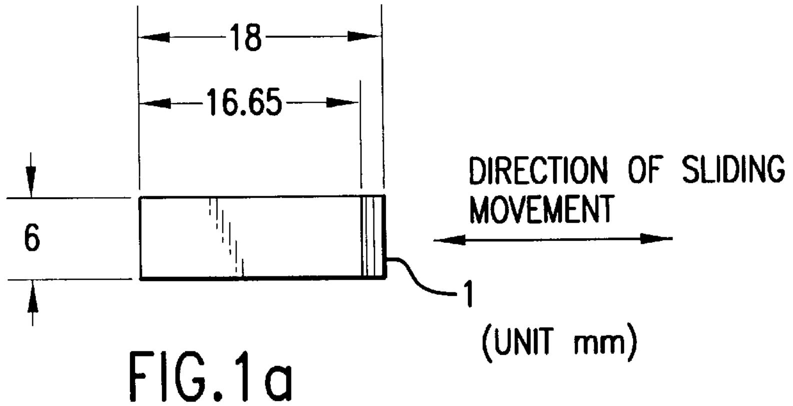
FIG. 1 is a dimensional view showing a pin used for scuffing tests.
Figure 1B:
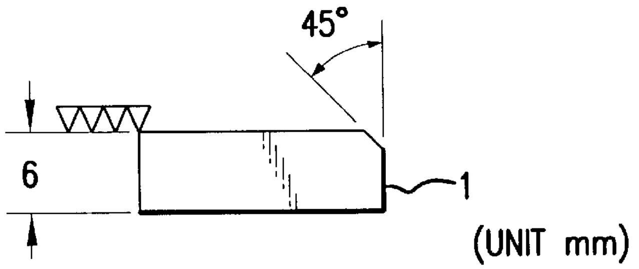

FIG. 1 shows the configuration and dimensions of a pin 1 used for the scuffing tests (area of the sliding surface=1 $cm^2$)

2. Disk

Figure 2:
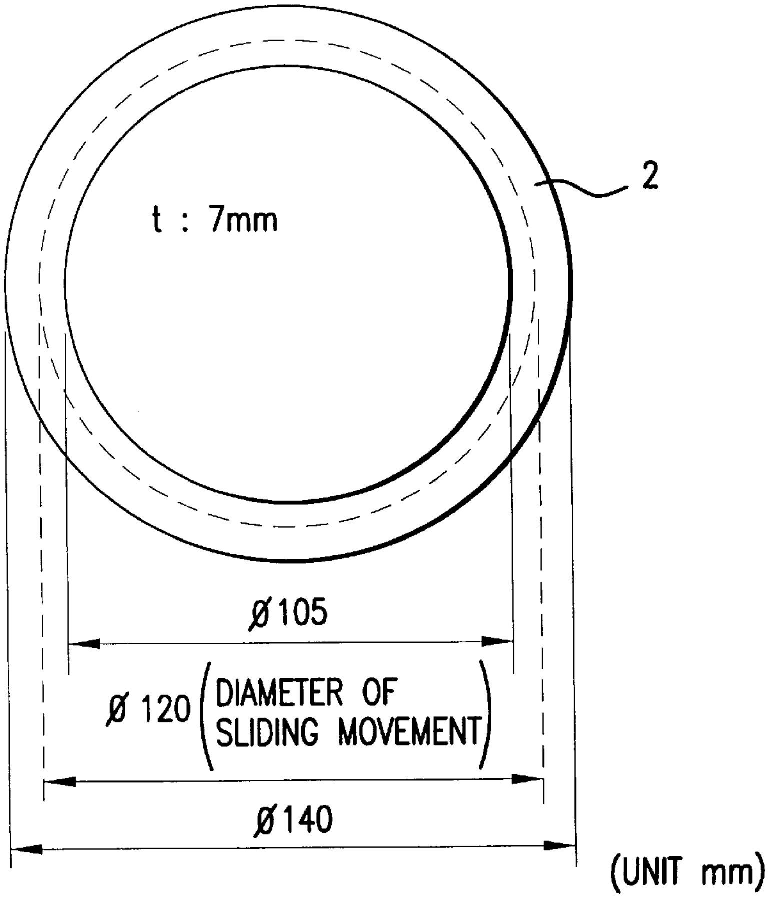
FIG. 2 is a dimensional view showing a disk used for scuffing tests.

FIG. 2 shows the configuration and dimensions of a disk 2. The test disk was high-phosphorus cast iron with the following composition.

Figure 3:
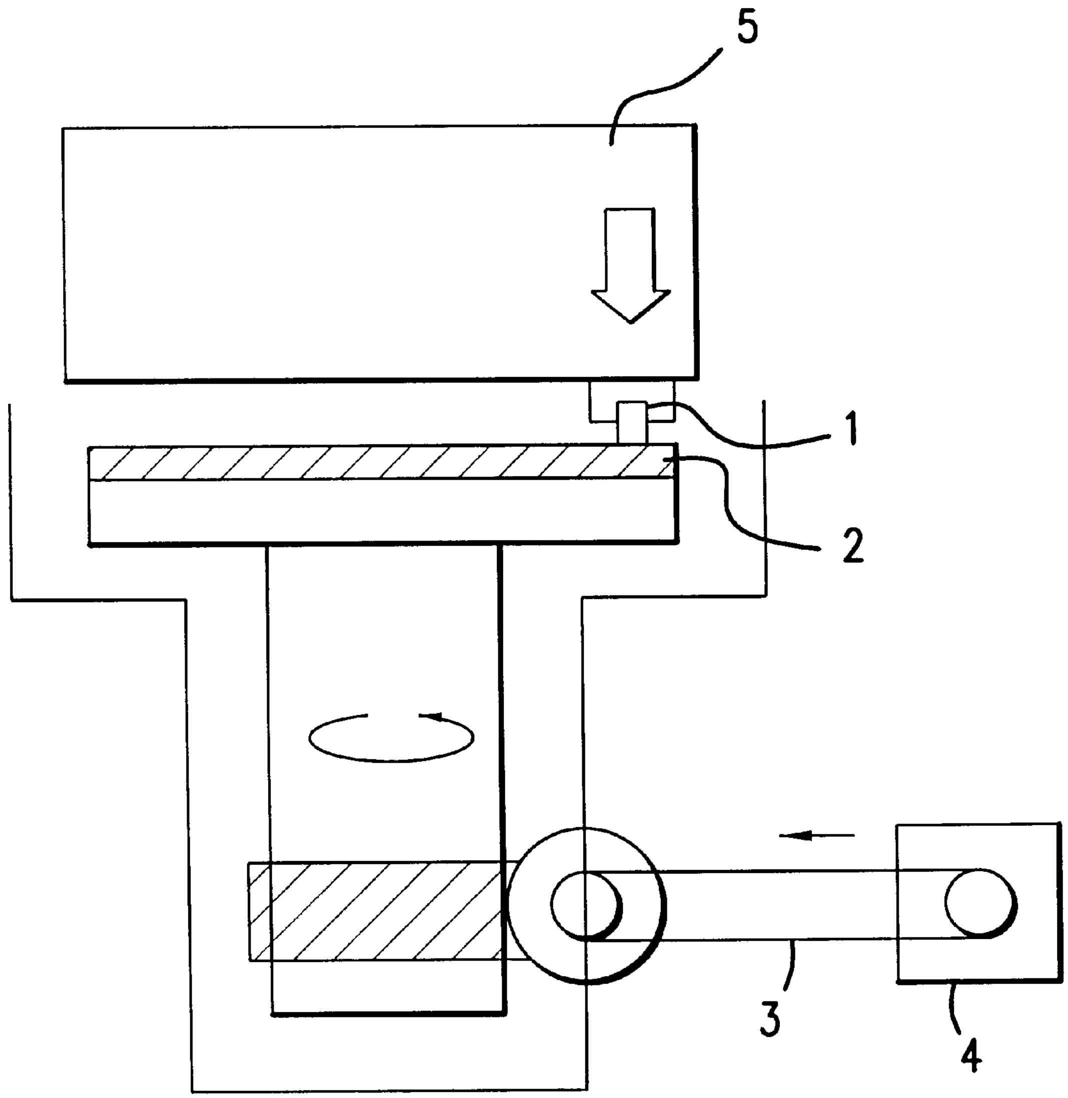
FIG. 3 is a schematic structural view showing a scuffing tester.

C: 3.23 wt %
Si: 1.93 wt %
Mn: 0.75 wt %
P: 0.22 wt %
S: 0.115 wt %
B: 0.05 wt %
Fe: rest (2) Method of scuffing test Measurements of scuffing characteristics were made using an abrasion tester of pin-on-disk type. FIG. 3 shows a schematic view of the tester.

The scuffing tests were made with the pin 1 being fixed and the disk 2 being rotated. As shown in FIG. 3, the disk was rotated through a belt 3 by a servo motor 4. The pin was loaded by a pneumatic load 5.

The diameter of sliding movement of the disk at the center of the test surface was ϕ120 mm and the sliding speed on the test surface was constant at 5 m/sec. The test lubricating oil was a mixture of lubricating oil SAE #30 and white kerosene at 1:1. The test lubricating oil was applied on the sliding surface of the rotating disk and the disk was rotated under no-load at a speed 5 m/sec for 30 seconds. After that, the disk was loaded to start the test. The setting Load was set to 245 N as an initial load, after 30 minutes, set to 490 N and further increased by 98 N for each 5 minutes.

For the scuffing test, time period until scuffing/load was measured. The anti-scuffing property was evaluated by comparing, in time period until scuffing/load, with a test piece formed of high-phosphorus cast iron or high-phosphorus cast iron treated by Cr plating which is a typical material of DE piston ring for ship, and considering the variation of friction coefficient μ during the scuffing test and the temperature change of the disk.

(3) Observation of scuffing test piece

The appearance and familiarity of the sliding surface before and after the scuffing test were observed by a microscope. The surface condition of the sliding surface before and after the scuffing test was observed by a laser microscope (Laser Microscope 1LM21 manufactured by Laser Tech Corporation) to measure the surface roughness thereof.

(Results of Scuffing Tests)

(1) Time period until scuffing/load

Figure 4A:
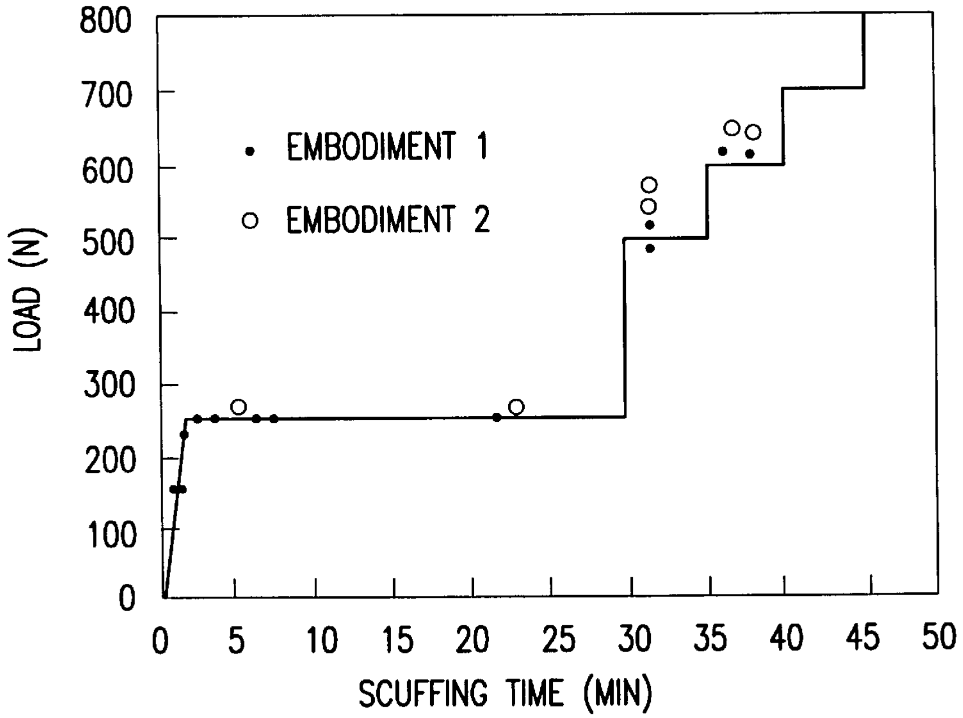
FIGS. 4(*a*) and 4(*b*) show graphs of the results of the scuffing tests.
Figure 4B:
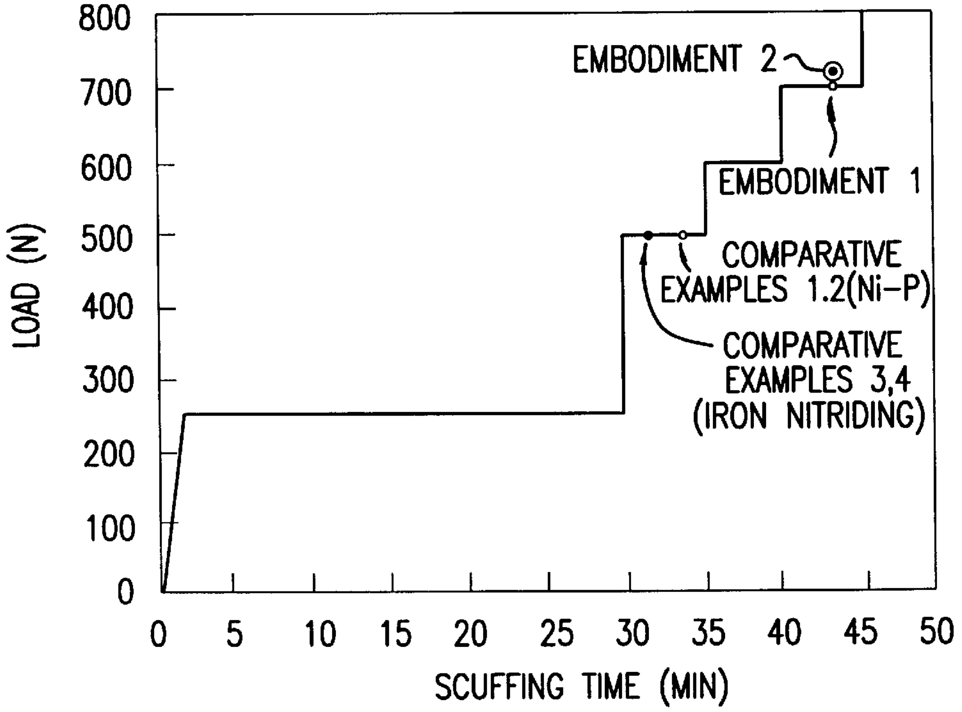

FIGS. 4(*a*), 4(*b*) show results of the scuffing tests of pins (time period until scuffing/load). FIG. 4(*a*) shows test results of the non-treated pin wherein the test was conducted with an initial running-in with load 98N, at sliding speed 5 m/sec, for 30 minutes and FIG. 4(*b*) shows test results of the nitrided pin, the Ni—P plated pin, the sulphurized pin.

As apparent from FIGS. 4(*a*), 4(*b*), wide scatter was observed in the test results of the non-treated pin, even after the running-in (load 98N, sliding speed 5 m/sec, and running time 30 minutes). On the other hand, as shown in FIG. 4(*b*), smaller scatter was observed in the test results of the nitrided pin, the Ni—P plated pin, the sulphurized pin, in which anti-scuffing properties were all relatively good. The results show that the sulphurizing was the best surface treatment to provide good anti-scuffing property.

(2) Variation of friction coefficient $\mu$ during scuffing tests

Figure 5A:
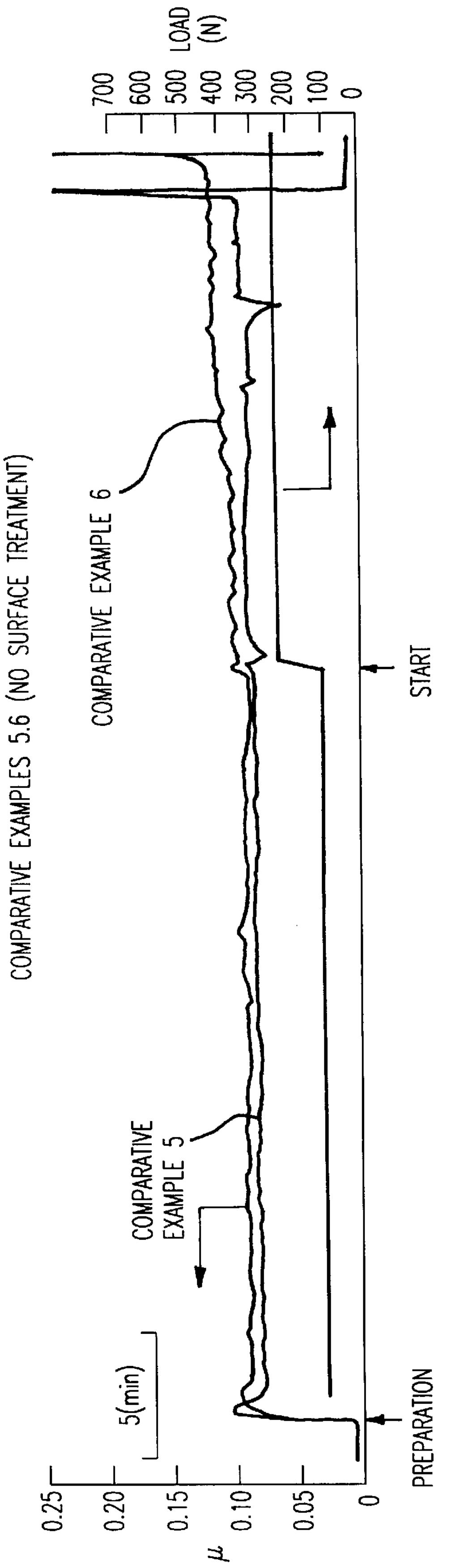
FIGS. 5(*a*) and 5(*b*) shows graphs of the measurements of friction coefficient μ.
Figure 5B:
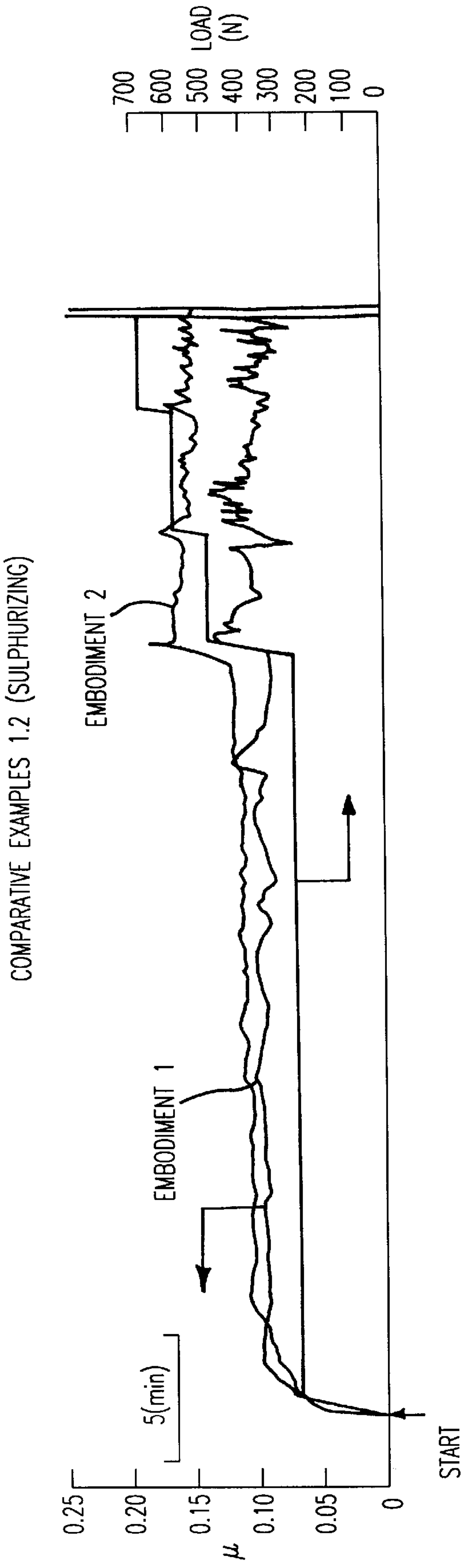

FIGS. 5(*a*) and 5(*b*) show elapsed changes such as friction coefficient $\mu$ during the scuffing tests as examples. The sliding speed was constant at 5 m/sec, the vertical axis of the graphs designate friction coefficient $\mu$ and load, and the abscissa axis designate time periods during the tests. FIG. 5(*a*) shows test results of the non-treated pin (with initial running-in) and FIG. 5(*b*) shows test results of the sulphurized pin.

In the abrasion test, when the friction coefficient $\mu$ rises suddenly ($\mu \geqq 0.5$), it is judged as the occurrence of scuffing. During the abrasion test, relatively large variation was observed for the friction coefficient $\mu$ of the non-treated pin as shown in FIG. 5(*a*). However, for the friction coefficient $\mu$ of the sulphurized pin and high-phosphorus cast iron disk, no significant variation was observed except at the occurrence of scuffing as shown in FIG. 5(*b*).

As described above, the wear resisting steel as a parent metal provided not always enough initial break in characteristics. Similarly, since the gas-nitrided pin and the Ni—P plated pin provided not always enough familiarity, relatively large variation was also observed for each friction coefficient $\mu$ thereof during the abrasion test. However, no large variation was observed for the friction coefficient $\mu$ of the sulphurized test piece and the hardness of the surface was lower than that of thee parent metal. Therefore, it was thought that the initial break in characteristics was improved. The running in characteristics of the wear resisting steel after the initial break in characteristics was also good and, as apparent from the results of the scuffing tests as shown in FIG. 4, the anti-scuffing thereof was excellent.

(3) Appearance of the sliding surface

As a result of observing the appearance of the sliding surface after the scuffing test, a phenomenon that a working face appears partially (hereinafter, referred as "partial working face") was observed in the non-treated pin where time period until scuffing is short. However, as for the Ni—P plated test piece and the nitrided test piece, there is no relation between the time period until scuffing and the partial working face.

On the other hand, for the sulphurized test piece, the sliding surface was damaged without significant partial working face, thereby making the time period until scuffing relatively long. That is, one of effects of the sulphurizing is improvement of the initial break in characteristics on the sliding surface having relatively high hardness.

(4) Picture of sliding surface

As a result of observing the picture of sliding surface before and after the scuffing test by the laser microscope, there was numerically non-significant difference between before and after the scuffing test in the surface roughness of the non-treated pin with the surface roughness after the scuffing test being slightly increased, i.e. the surface roughness was about 1.6 $\mu$m and about 2. 0 $\mu$m before and after the scuffing test, respectively. Stick-like flaws caused by proceeding of scuffing damage and traces of penetration of lubricating oil were observed on the surface of the test piece after the scuffing test.

As a result of observing the picture of sliding surface of the sulphurized test piece, there is no track caused by machining in the surface of the test piece before the scuffing test because of the sulphurizing. It is thought that the sulphurized test piece is provided with amorphous FexS on the surface thereof. Therefore, though the surface roughness of the test piece was increased to about 14.3 $\mu$m, the surface irregularities tended to be smoothed. After the scuffing test, though the surface roughness on a sliding area was reduced (less than about 4.9 $\mu$m), a significant scuffing damage was not observed. The test piece was provided with a cavity about 70 $\mu$m in diameter and 5 $\mu$m in depth formed in the surface thereof due to the sulphurizing. It is thought that the surface irregularities were effective in retaining oil. After the scuffing test, the surface roughness on the area where was completely sliding was reduced (about 2.5 $\mu$m) and the sulphurized layer died out. That is, as a result of the scuffing test of the sulphurized test piece, the time period until scuffing was relatively long and the wear resisting steel as the parent metal has relatively high hardness. Therefore, it is thought that as long as the initial break in characteristics is improved, the running in characteristics after that is satisfactory.

(5) Summary

The followings are apparent from Embodiment 1 and Comparative Examples 1 through 3 as described above.

1. Wide scatter was observed in the result of the scuffing test of the non-treated pin and the wear resisting steel as the parent metal thereof provided not always enough initial break in characteristics.

The scatter in the test result was reduced by nitriding, Ni—P plating, or sulphurizing the pin and the anti-scuffing thereof is improved. The results show that the sulphurizing was the best surface treatment to provide good anti-scuffing property.

2. During the abrasion test, no significant variation was observed for the friction coefficient $\mu$ of the sulphurized pin except at the occurrence of scuffing.

3. A partial working face was observed in the non-treated pin and stick-like flaws caused by proceeding of scuffing damage and traces of penetration of lubricating oil were observed on the surface of the test piece after the scuffing test. There was numerically non-significant difference between before and after the scuffing test in the surface roughness of the non-treated pin, i.e. about 1.6 $\mu$m and about 2.0 $\mu$m before and after the scuffing test, respectively.

4. Because of the sulphurizing, the sulphurized test piece is provided with amorphous FexS on the surface thereof, the surface roughness of the test piece was increased (surface roughness=about 14.3 $\mu$m), and the surface irregularities tended to be smoothed. The surface irregularities were effective in retaining oil.

After the scuffing test, the surface roughness was reduced (about 2.5 $\mu$ m) and the sulphurized layer died out. However, it is thought that as long as the initial break in characteristics is improved, the running in characteristics after that is satisfactory for the wear resisting steel.

The description will now be made as regard to embodiments and comparative examples of the ring spring.

(Embodiments)

A ring spring consisting of combination of four inner rings made of wear resisting steel having compositions of Embodiment 1 shown in Table 1 and five outer rings made of SUP10 steel was prepared. The outer diameter of each outer ring was 100 mm and the inner diameter of each inner ring was 60 mm. The sliding surfaces between the inner rings and the outer rings were applied with $MoS_2$ grease.

Figure 6A:
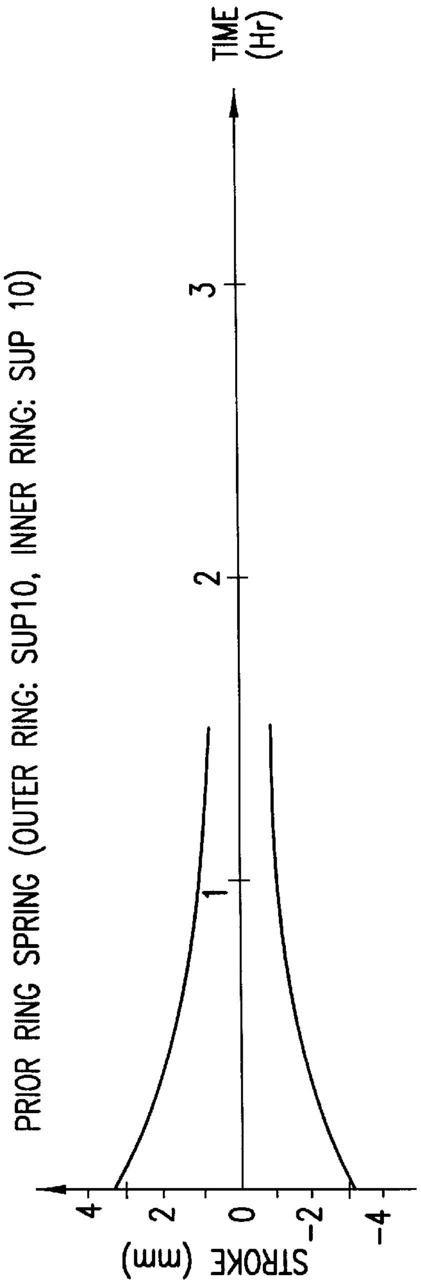
FIGS. 6(*a*) and 6(*b*) shows graphs of the results of ring spring tests.
Figure 6B:
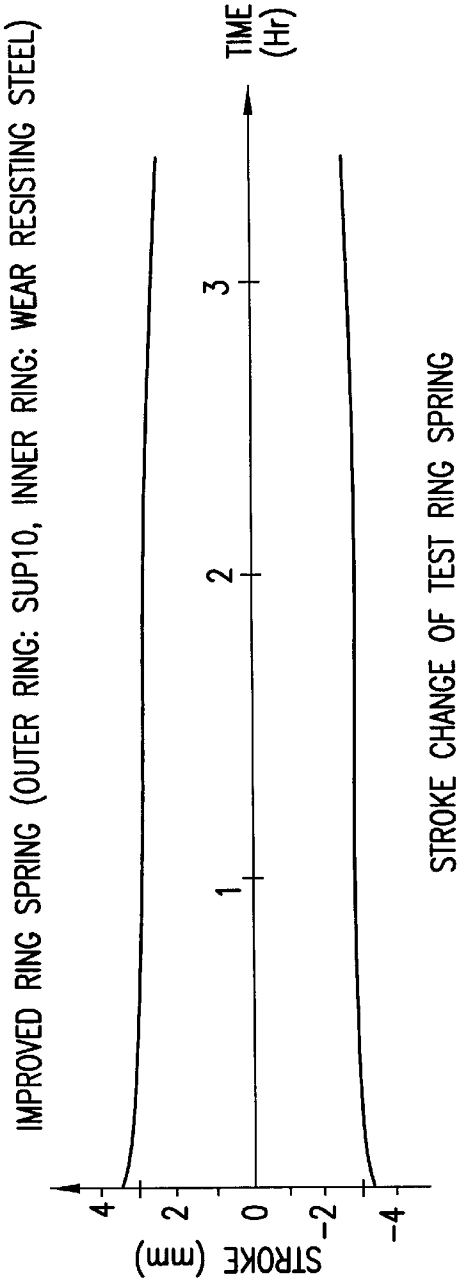

The ring spring was loaded with an alternate compressive load between minimum 1 tons and maximum 10 tons at 0.4 Hz and the strokes thereof were measured. The result is shown in FIG. 6(*b*).

A ring spring was prepared in the same manner but using wear resisting steel having compositions of Embodiment 2. The result of measuring the strokes thereof was the same as the above case.

(Comparative Examples)

A ring spring was prepared in the same manner but using SUP10 steel for both outer rings and inner rings and the load test was conducted with the ring spring under the same condition. The result of measuring the strokes thereof is shown in FIG. 6(*a*).

It is apparent from FIGS. 6(*a*) and 6(*b*) that the stroke can be kept at a high level for a long period in accordance with the present invention.

As described above, the present invention can provide wear resisting steel having excellent resistance to wear and scuffing, providing high strength and great elongation and high toughness, and further providing good machinability. Such wear resisting steel according to the present invention is particularly useful as a material of a sliding member for a cylinder in an internal combustion engine such as a piston ring, a cylinder liner, or a piston skirt of an internal combustion engine, and a ring spring.

The sliding member and the ring spring of the present invention have excellent wear resistance and high durability.

We claim:

1. Wear resisting steel consisting of:

carbon: equal to or less than 2.2% by weight;

silicon: equal to or less than 1.2% by weight;

manganese: equal to or more than 0.2% by weight and less than 1.20 % by weight;

chromium: equal to less than 16% by weight;

phosphorus: equal to or less than 0.08% by weight;

sulfur: equal to or more than 0.15% by weight and less than 0.60% by weight;

other compositions: equal to or less than 2.0% by weight; and the balance substantially comprising iron, wherein a surface of the wear resisting steel is treated by baking molybdenum dioxide after electrolyzing and sulphurizing.

2. Wear resisting steel as claimed in claim 1, wherein chromium content is equal to or less than 6.0% by weight.

3. Wear resisting steel as claimed in claim 2, wherein the steel consists of carbon: 0.25–2.0% by weight;

silicon: 0.20–1.20% by weight;

manganese: 0.40–1.20% by weight;

chromium: 0.80–5.50% by weight;

phosphorus: equal to or less than 0.05 % by weight;

sulfur: 0.20–0.50% by weight;

other compositions: equal to or less than 1.0% by weight; and the balance substantially comprising iron.

4. Wear resisting steel as claimed in claim 1, wherein the steel consists of carbon: 0.60–2.0% by weight;

silicon: 0.10–0.40% by weight;

manganese: 0.40–1.0% by weight;

chromium: 11.0–15.0% by weight;

phosphorus: equal to or less than 0.05% to by weight;

sulfur: 0.20–0.60% by weight;

other compositions: equal to or less than 1.0% by weight; and the balance substantially comprising iron.

5. Wear resisting steel as claimed in claim 1, wherein the surface thereof is sulphurized by electrolysis.

6. A sliding member for a cylinder made of wear resisting steel as claimed in claim 1.

7. A sliding member for a cylinder as claimed in claim 6, wherein the sliding member is a piston ring, a cylinder liner, or a piston skirt of an internal combustion engine.

8. A ring spring comprising inner rings and outer rings wherein at least one of sliding surfaces of the inner rings and outer rings is made of wear resisting steel as claimed in claim 1.

9. A sliding member as claimed in claim 6, wherein the surface thereof is sulphurized by electrolysis.

10. A ring spring as claimed in claim 8, wherein the surfaces are sulphurized by electrolysis.

* * * * *